United States Patent [19]

Miyaoh

[11] Patent Number: 5,255,927
[45] Date of Patent: Oct. 26, 1993

[54] METAL LAMINATE TYPE CYLINDER HEAD GASKET

[75] Inventor: Yoshio Miyaoh, Tokyo, Japan

[73] Assignee: Ishikawa Gasket Co., Ltd., Tokyo, Japan

[21] Appl. No.: 887,493

[22] Filed: May 26, 1992

[30] Foreign Application Priority Data

May 30, 1991 [JP] Japan .................. 3-39822

[51] Int. Cl.$^5$ .............................................. F16J 15/08
[52] U.S. Cl. .................... 277/235 B; 277/234; 277/236
[58] Field of Search ............. 277/235 B, 236, 234

[56] References Cited

U.S. PATENT DOCUMENTS

| 4,254,963 | 3/1981 | Skrycki | 277/235 BX |
| 4,791,897 | 12/1988 | Udagawa | 277/235 R |
| 4,803,965 | 2/1989 | Udagawa et al. | 277/235 B |
| 4,809,653 | 3/1989 | Udagawa et al. | 277/235 BX |
| 5,078,413 | 1/1992 | Miyaoh | 277/235 B |
| 5,161,498 | 11/1992 | Miyaoh | 277/235 BX |
| 5,165,372 | 11/1992 | Miyaoh | 277/235 BX |

FOREIGN PATENT DOCUMENTS

| 0143368 | 6/1988 | Japan | 277/235 B |
| 63-143369 | 6/1988 | Japan . | |
| 0024148 | 1/1989 | Japan | 277/235 B |
| 2073335 | 10/1981 | United Kingdom | 277/235 B |
| 2203806 | 10/1988 | United Kingdom . | |

Primary Examiner—William A. Cuchlinski, Jr.
Assistant Examiner—James K. Folker
Attorney, Agent, or Firm—Kanesaka and Takeuchi

[57] ABSTRACT

A metal laminate type cylinder head gasket is installed in an engine having a cylinder block with a cylinder bore, a cylinder head with an auxiliary combustion chamber, and a mouth plate attached to the cylinder head. The gasket is basically formed of first and second plates laminating together, and a sealing device around the cylinder bore. The second plate is situated under the first plate and includes first and second beads. The first bead extends at least partly around the cylinder bore, and the second bead is located adjacent to and at a predetermined distance outwardly away from a part of a contour of the mouth plate. The second bead intersects the first bead at intersecting portions and includes a wide portion having a width wider than that of the intersecting portion. The tightening pressure applied to the second bead is concentrated at the intersection portions.

10 Claims, 2 Drawing Sheets

METAL LAMINATE TYPE CYLINDER HEAD GASKET

BACKGROUND OF THE INVENTION AND RELATED ART STATEMENT

The present invention relates to a metal laminate type cylinder head gasket for an internal combustion engine with an auxiliary combustion chamber.

In an engine with an auxiliary combustion chamber, a cylinder head is provided with a mouth plate to close the auxiliary combustion chamber. When the engine is operated, gas at first combusts at the auxiliary combustion chamber, and then gas at a cylinder bore combusts. Therefore, the mouth plate receives combustion pressures from both the auxiliary combustion chamber and the cylinder bore.

As shown in FIGS. 1 and 2, a cylinder head H is provided with a depression K, to which a mouth plate L is inserted, so that an auxiliary combustion chamber M is defined inside the depression K. A gasket 10 is installed between the cylinder head H and a cylinder block J to seal therebetween. The mouth plate L is supported partly by a portion N of the gasket 10.

As stated above, when the engine is operated, combustion pressure is applied to the mouth plate L, so that large pressure is applied to the portion N of the gasket. Sometimes, the mouth plate L moves up and down.

In the conventional steel laminate gasket 10 as shown in FIGS. 1 and 2, the gasket 10 is formed of an upper plate, lower plate and three middle plates. A wire ring is installed around the cylinder bore Hc. Since the gasket 10 does not resiliently support the mouth plate, combustion gas is liable to leak through the mouth plate.

In order to resiliently support the mouth plate, one of the middle plates may be replaced by a plate with beads at the portion N of the gasket, which is disclosed in Japanese Patent Publication (KOKAI) No. 59-90745. Also, a bead may be formed on a plate at a portion outside the mouth plate to seal therearound (Japanese Patent Publication No. 60-162037). Further, in case a bead outside the mouth plate intersects a bead around the cylinder bore, additional beads may be formed outside the intersecting portions of the two beads (Japanese Utility Model Publication No. 63-166651).

In U.S. Pat. Nos. 4,791,897, 4,803,965 and No. 4,809,653, one of the middle plates is provided with different kind of beads on and around the portion N under the mouth plate L to support the mouth plate L and seal therearound.

The gaskets as proposed by the patents operate as intended. However, in case the gasket can not be strongly compressed or rigidity of the cylinder head is not so strong, the above gaskets are not suitable. Namely, sufficient tightening pressure can not be applied to a portion where high tightening pressure is required, i.e. intersecting portions of the bead outside the mouth plate and the bead around the cylinder bore. Therefore, combustion gas may leak from the mouth plate or the cylinder bore.

Accordingly, one object of the invention is to provide a metal laminate type cylinder head gasket, which can securely seal around a mouth plate and a cylinder bore.

Another object of the invention is to provide a metal laminate type cylinder head gasket as stated above, which is useful for an engine where the gasket can not be sufficiently compressed.

A further object of the invention is to provide a metal laminate type cylinder head gasket as stated above, which can be easily and economically manufactured.

Further objects and advantages of the invention will be apparent from the following description of the invention.

SUMMARY OF THE INVENTION

A metal laminate type cylinder head gasket of the invention is installed in an internal combustion engine with an auxiliary combustion chamber. Namely, a cylinder head is provided with a depression for the auxiliary combustion chamber and a mouth plate to close the depression. The gasket is interposed between the cylinder head and a cylinder block, and supports the mouth plate.

The gasket is basically formed of first and second plates extending substantially throughout an entire area of the engine, and sealing means formed around the cylinder bore to seal therearound.

The second plate is situated under the first plate and includes first and second beads. The first bead extends under the mouth plate to at least partly surround the cylinder bore. The second bead is located adjacent to and at a predetermined distance outwardly away from a part of a contour of the mouth plate.

The second bead intersects the first bead at intersecting portions near the cylinder bore. The second bead includes in a center area thereof a wide portion having a width wider than that at the intersecting portions. Namely, the width at the wide portion is wider than the width of the second bead in or close to the intersecting portion. Therefore, when the gasket is tightened, the area around the mouth plate is securely sealed.

This structure is especially useful for the engine where the gasket can not be strongly compressed or rigidity of the cylinder head is not strong. Namely, in some engines, the cylinder head can not be tightened strongly, because the cylinder head or the cylinder block is not made strong, or the cylinder bore deforms. In some cases, even if the cylinder head is strongly tightened, high surface pressure is not equally obtained throughout the entire surface on the gasket, because rigidity of the cylinder head is insufficient.

In the engine where high tightening pressure is not applied, in case the second bead is formed equally, i.e. the width of the second bead is constant and the gasket is tightened, the second bead is not compressed sufficiently. As a result, sufficient tightening pressure can not be applied to the intersecting portion of the first and second beads where gas is liable to leak.

In the engine where rigidity of the cylinder head is not strong, in case the second bead is formed equally, the center part of the second bead is not sufficiently compressed.

In the present invention, since the second bead has the wide portion, the wide portion can be easily compressed. Therefore, in the engine where the high tightening pressure can not be applied, the tightening pressure by the bolts is not used so much at the wide portion and can be concentrated at the intersecting portions of the first and second beads. Accordingly, the intersecting portions can be sufficiently compressed to seal thereat.

In the engine where the rigidity of the cylinder head is not strong, since the wide portion can be easily compressed, the second bead can be equally compressed to seal around the mouth plate.

The width of the wide portion of the second bead gradually increases as a distance from one of the intersecting portions close to the wide portion increases. The first bead may extend around the entire area of the cylinder bore.

The second plate may further include a third bead located adjacent to and at a predetermined distance inwardly away from the part of the contour of the mouth plate. The third bead also intersects the first bead and supports the mouth plate. A fourth bead may be formed in the second plate at an area surrounded between the first and third beads.

The gasket of the invention may further includes additional plates and other covering or sealing means around the cylinder bore.

DETAILED DESCRIPTION OF PREFERRED EMBODIMENTS

Figure 1:
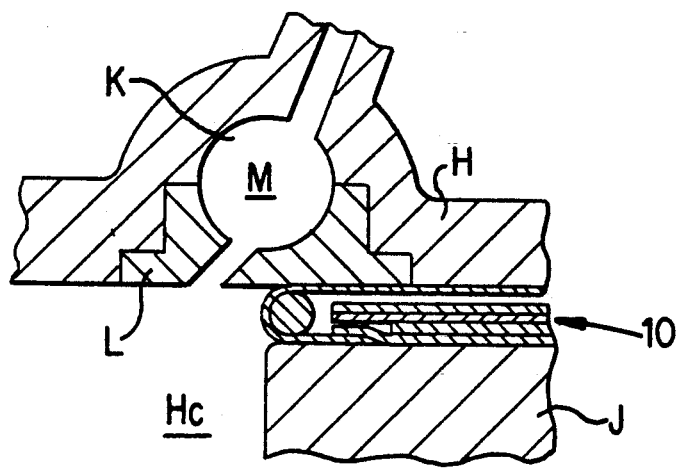
FIG. 1 is an explanatory section view of a conventional gasket installed between a cylinder head and a cylinder block.
Figure 2:
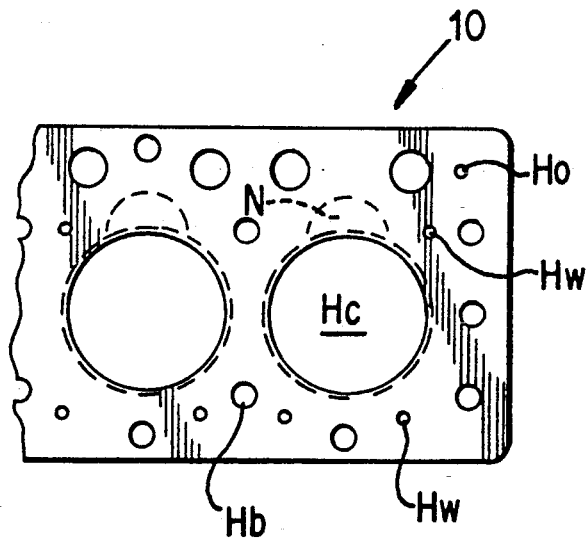
FIG. 2 is a plan view of a part of the conventional gasket shown in FIG. 1.
Figure 3:
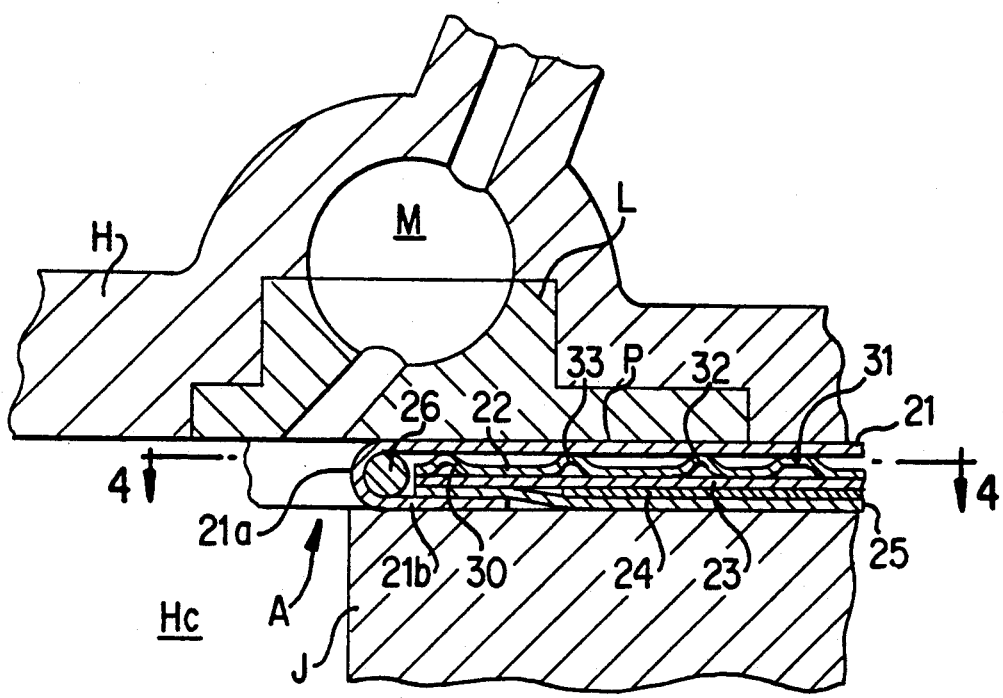
FIG. 3 is an explanatory section view of a metal laminate gasket of the invention installed between a cylinder head and a cylinder block.
Figure 4:
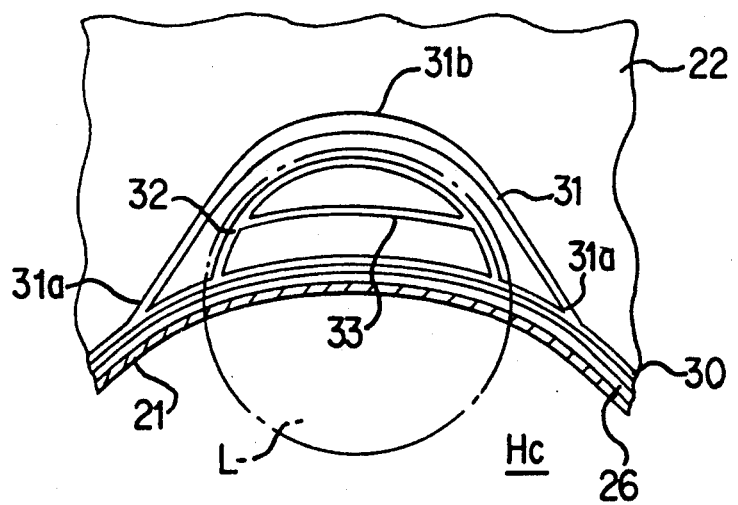
FIG. 4 is a section view taken along line 4—4 in FIG. 3.

Referring to FIGS. 3 and 4, a metal laminate type cylinder head gasket A of the invention is shown. The gasket A includes a plurality of cylinder bores Hc, water holes Hw, oil holes Ho, bolt holes Hb and so on, as in the conventional gasket shown in FIG. 2. Since the present invention is directed to a sealing mechanism around the cylinder bore Hc, sealing means for sealing around other holes is not explained. Any sealing means may be used for sealing around other holes.

The gasket A of the invention is installed between a cylinder head H and a cylinder block J. The cylinder head H includes a mouth plate L to form an auxiliary combustion chamber M therein. The mouth plate L is supported by the gasket A at a portion under the mouth plate L.

The gasket A is formed of an upper plate 21, three middle plates 22, 23, 24 and a lower plate 25, which extend substantially throughout the entire area of the engine. A wire ring 26 is situated around the cylinder bore Hc.

The upper plate 21 includes a curved portion 21a to define the cylinder bore Hc, and a flange 21b extending from the curved portion 21a. The wire ring 26 is situated adjacent to the curved portion 21a.

As shown in FIG. 4, the middle plate 22 includes a hole for the cylinder bore Hc, and a bead 30 to surround the cylinder bore Hc. The middle plate 22 also includes a bead 31 for surrounding a portion under and outside the mouth plate L. The bead 31 intersects the bead 30 at intersecting portions 31a.

The bead 31 has a middle portion 31b, wherein the width is wider than a portion of the bead 31 near the intersecting portions 31a. The middle portion 31b gradually becomes wider as the distance from the intersection 31a increases to a center of the middle portion 31b.

Accordingly, when the gasket is tightened, the middle portion 31b is easily compressed.

The middle plate 22 further includes beads 32, 33 inside the bead 31 to support the mouth plate L. The bead 32 is arranged to extend along a part of a contour of the mouth plate L and intersects the bead 30. The bead 33 extends concentrically to the bead 30 and intersects the bead 32.

The middle plate 23 is situated under the middle plate 22, and the middle plate 24 is situated under the middle plate 23. The middle plate 24 includes a relatively large hole around the cylinder bore Hc, so that the middle plate 24 does not overlap the flange 21b. The lower plate 25 is situated under the middle plate 24, and an edge portion of the lower plate 25 is located above the flange 21b.

When the gasket A is situated between the cylinder head H and the cylinder block J and is tightened, the wire ring 26 and the beads 30, 31, 32, 33 are compressed. In particular, the beads 30, 32, 33 resiliently support the mouth plate L. The wire ring 26 seals around the cylinder bore Hc and supports the mouth plate L. The bead 30 also seals around the cylinder bore Hc. The bead 31 seals around the mouth plate L.

In the gasket A, the intersecting portions 31a are located slightly away from the mouth plate L, and the bead 31 has the middle portion 31b wider than the intersecting portions 31a. Therefore, when the gasket A is tightened, the middle portion 31b is relatively easily compressed.

Accordingly, in case the gasket can not be tightened strongly, the tightening force applied to the gasket can be concentrated at the intersecting portions 31a. Therefore, the intersecting portions 31a can be sufficiently compressed to seal thereat.

In this respect, in case the bead 31 has the equal width throughout the entire length thereof, when the gasket A is tightened, a fair amount of the tightening pressure is used to compress the bead. Therefore, the sufficient amount of pressure for compressing the intersecting portions 31a may not be obtained thereat, so that leakage of combustion gas may occur at the intersecting portions 31a.

In case the cylinder head does not have strong rigidity, the gasket is useful, because the wide middle portion of the bead can be compressed to seal thereat.

The gasket A is especially useful for the engine that the rigidity of the cylinder head is not strong, or the gasket can not be strongly tightened. In both cases, when the gasket is tightened, leakage may readily happen at the portions that the gasket is not sufficiently compressed. In the present invention, the leakage is effectively prevented.

In the gasket A, the bead 30 is formed to surround the entire cylinder bore Hc. However, if the sealing around the cylinder bore Hc is sufficient by the wire ring, the bead 30 need not surround the entire cylinder bore Hc. The bead 30 may extend only between the intersecting portions 31a. Also, the beads 32, 33 for supporting the mouth plate L may be replaced by other means for supporting the mouth plate L. Further, the wide portion 31b need not be located in the middle of the bead 31, and may be located close to one of the intersecting portions 31a.

In the present invention, the bead for sealing around the mouth plate is formed outside the mouth plate, and a part of the bead is widened to be easily compressed. Although the surface pressure at the wide portion is not so strong, the surface pressure at the necessary portions can be made strong. Accordingly, the gas leakage can be sufficiently prevented.

While the invention has been explained with reference to the specific embodiments of the invention, the explanation is illustrative and the invention is limited only by the appended claims.

What is claim is:

1. A metal laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, comprising:
   a first plate extending substantially throughout an entire area of the gasket, said first plate having a first hole corresponding to the cylinder bore of the cylinder block,
   sealing means formed around the cylinder bore to seal therearound, and
   a second plate situated under the first plate to form a metal laminate gasket, said second plate having a second hole corresponding to the cylinder bore, a first bead extending at least partly around the second hole under the mouth plate to support the same, and a second bead located adjacent to and at a predetermined distance outwardly away from a part of a contour of the mouth plate, said second bead intersecting the first bead at intersecting portions and having a wide portion having a width wider than that of the intersecting portions, said width of the wide portion gradually increasing as a distance from one of the intersecting portions close to the wide portion increases so that when the gasket is tightened, tightening pressure applied to the second bead is substantially concentrated at the intersecting portion to thereby securely seal the cylinder bore.

2. A metal laminate type cylinder head gasket according to claim 1, wherein said first bead extends around an entire area of the cylinder bore to seal therearound.

3. A metal laminate type cylinder head gasket according to claim 2, wherein said second plate further includes a third bead located adjacent to and at a predetermined distance inwardly away from the part of the contour of the mouth plate, said third bead intersecting the first bead and supporting the mouth plate.

4. A metal laminate type cylinder head gasket according to claim 3, wherein said second plate further includes a fourth bead formed at an area surrounded between the first and third beads to support the mouth plate.

5. A metal laminate type cylinder head gasket according to claim 2, wherein said first plate includes a curved portion to define the first hole, and a flange extending in a direction away from the first hole to be located under the first plate.

6. A metal laminate type cylinder head gasket according to claim 5, wherein said sealing means is a wire ring situated between the curved portion and the first plate.

7. A metal laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, comprising:
   a first plate extending substantially throughout an entire area of the gasket, said first plate having a first hole corresponding to the cylinder bore of the cylinder block,
   sealing means formed around the cylinder bore to seal therearound, and
   a second plate situated under the first plate to form a metal laminate gasket, said second plate having a second hole corresponding to the cylinder bore, a first bead extending at least partly around the second hole under the mouth plate to support the same, and a second bead located adjacent to and at a predetermined distance outwardly away from a part of a contour of the mouth plate, said second bead intersecting the first bead at intersecting portions and having a wide portion having a width wider than that of the intersecting portions, said wide portion being located in a middle portion of the second bead equally spaced apart from the intersecting portions.

8. A metal laminate type cylinder head gasket according to claim 7, wherein tightening pressure applied to the second bead is substantially concentrated at the intersecting portions, when the gasket is tightened, to thereby securely seal the cylinder bore.

9. A metal laminate type cylinder head gasket according to claim 8, wherein said second plate further includes a third bead located adjacent to and at a predetermined distance inwardly away from the part of the contour of the mouth plate, said third bead intersecting the first bead and supporting the mouth plate.

10. A metal laminate type cylinder head gasket according to claim 9, wherein said second plate further includes a fourth bead formed at an area surrounded between the first and third beads to support the mouth plate.

* * * * *